United States Patent
Wendling

(10) Patent No.: US 10,078,738 B2
(45) Date of Patent: *Sep. 18, 2018

(54) LOCKED ELEMENT FOR USE IN A GRAPHICAL MODELING ENVIRONMENT

(71) Applicant: The MathWorks, Inc., Natick, MA (US)

(72) Inventor: William C. Wendling, Emeryville, CA (US)

(73) Assignee: The MathWorks, Inc., Natick, MA (US)

( * ) Notice: Subject to any disclaimer, the term of this patent is extended or adjusted under 35 U.S.C. 154(b) by 825 days.

This patent is subject to a terminal disclaimer.

(21) Appl. No.: 14/193,937

(22) Filed: Feb. 28, 2014

(65) Prior Publication Data

US 2014/0181920 A1    Jun. 26, 2014

Related U.S. Application Data

(63) Continuation of application No. 11/841,951, filed on Aug. 20, 2007, now Pat. No. 8,707,190, which is a continuation of application No. 11/227,462, filed on Sep. 15, 2005, now Pat. No. 8,719,716.

(51) Int. Cl.
| | |
|---|---|
| *G06F 3/0484* | (2013.01) |
| *G06F 21/31* | (2013.01) |
| *G06F 8/34* | (2018.01) |
| *G06F 17/50* | (2006.01) |
| *G06F 21/62* | (2013.01) |
| *G06F 8/20* | (2018.01) |

(52) U.S. Cl.
CPC ............ *G06F 21/31* (2013.01); *G06F 8/20* (2013.01); *G06F 8/34* (2013.01); *G06F 17/5009* (2013.01); *G06F 21/6227* (2013.01)

(58) Field of Classification Search
CPC .......... G06F 8/34; G06F 17/5009; G06F 8/20; G06F 21/14; G06F 21/31
See application file for complete search history.

(56) References Cited

U.S. PATENT DOCUMENTS

| | | |
|---|---|---|
| 4,831,525 A | 5/1989 | Saito et al. |
| 5,269,014 A | 12/1993 | Ogino |
| 5,301,301 A | 4/1994 | Kodosky et al. |
| 6,212,672 B1 | 4/2001 | Keller et al. |
| 6,226,692 B1 | 5/2001 | Miloushev et al. |
| 6,507,166 B2 | 1/2003 | MacEratini et al. |
| 6,668,325 B1 | 12/2003 | Collberg et al. |
| 6,760,842 B1 | 7/2004 | Miller et al. |

(Continued)

OTHER PUBLICATIONS

Sosonkin et al., "Obfuscation of Design Intent in Object-Oriented Applications", Oct. 2003, ACM, pp. 1-12.

(Continued)

*Primary Examiner* — Namitha Pillai
(74) *Attorney, Agent, or Firm* — Harrity & Harrity, LLP

(57) ABSTRACT

In a graphical modeling environment, a method of providing varying levels of protection relating to functionalities associated with at least some elements of a block diagram model, the method including: receiving a selection of one of the elements; receiving an indication of a desired authorization required to use at least one function of the selected element; implementing the indicated authorization for the use of the at least one function; and preventing, without obtaining of the authorization, an attempted use of the at least one function.

20 Claims, 13 Drawing Sheets

(56) References Cited

U.S. PATENT DOCUMENTS

| | | | |
|---|---|---|---|
| 6,961,686 | B2 | 11/2005 | Kodosky et al. |
| 6,971,065 | B2 | 11/2005 | Austin |
| 7,051,200 | B1 | 5/2006 | Manferdelli et al. |
| 7,089,530 | B1 | 8/2006 | Dardinski et al. |
| 7,124,445 | B2 | 10/2006 | Cronce et al. |
| 7,137,100 | B2 | 11/2006 | Iborra et al. |
| 7,155,702 | B2 | 12/2006 | Krishna et al. |
| 7,216,334 | B2 | 5/2007 | Kodosky et al. |
| 7,340,462 | B2 | 3/2008 | Bertrand et al. |
| 7,689,969 | B1 | 3/2010 | Wendling |
| 2002/0007483 | A1 | 1/2002 | Lopez |
| 2002/0016954 | A1 | 2/2002 | Charisius et al. |
| 2003/0023859 | A1 | 1/2003 | Kiddy |
| 2003/0071845 | A1 | 4/2003 | King et al. |
| 2003/0076355 | A1 | 4/2003 | Kodosky |
| 2003/0172369 | A1 | 9/2003 | Kodosky et al. |
| 2003/0196187 | A1 | 10/2003 | Kodosky et al. |
| 2004/0034846 | A1 | 2/2004 | Ortal et al. |
| 2004/0221256 | A1 | 11/2004 | Martin et al. |
| 2006/0259871 | A1 | 11/2006 | Washington et al. |
| 2006/0265446 | A1 | 11/2006 | Elgressy et al. |
| 2006/0271921 | A1 | 11/2006 | Cronce et al. |
| 2006/0272023 | A1 | 11/2006 | Schmeidler et al. |
| 2007/0074286 | A1 | 3/2007 | Wendling |
| 2008/0034215 | A1 | 2/2008 | Wendling |

OTHER PUBLICATIONS

Linn et al., "Obfuscation of Executable Code to Improve Resistance to Static Disassembly", Oct. 2003, ACM, pp. 290-299.
The MathWorks, Inc., "SIMULINK Model-Based and System-Based Design", Jul. 2002, Version 5, http://www.weizmann.ac.il/matlab/pdf_doc/simulink/sfunctions.pdf, pp. 1-556.
Wang et al., "Coliisions for Hash Functions MD4, MD5, HAVAL-128 and RIPEMD", Aug. 17, 2004, pp. 1-4.
Bruce Schneier, "Opinion: Cryptanalysis of MD5 and SHA: Time for a New Standard", Aug. 19, 2004, Computerworld, At the Crpto 2004 Conference in Santa Barbara, pp. 1-2.
European Summons to Attend Oral Proceedings for Application No. 06814746.1, 7 pages, dated Jul. 10, 2013.
European Office Action for Application No. 06814746.1, 5 pages, dated May 18, 2012.
Boulila, Naoufel, "Group Support for Distributed Collaborative Concurrent Software Modeling," *Proceedings of the 19th International Conference on Automated Software Engineering*, pp. 422-425 (2004).
Cera, Christopher et al., "Role-Based Viewing Envelopes for Information Protection in Collaborative Modeling," *Computer-Aided Design*, vol. 36: pp. 873-886 (2004).
http://www.cloakware.com.
http://www.semdesigns.com.
International Search Report for Application PCT/US2006/036047, dated Jan. 31, 2007.

```
_Qg15QcdaPeOVO5NVG4kJGO _bSqObCxoIECPcW5PSpKMSO.
_bSqObCxoIECPcW5PSO = _6Uw166Qg15Ak_2Bkk_2Bk_.
_jwmAjgoHAhoXAisXMR14M_[_7W3H7_G5OZO7V_17gm9fg1];{
_cW5PcOZG5O3NVO5Nfjyuf2 _04JFOpF2Cok5Qg15VNKLHO;const
_Qg15QcdaPeOVO5NVG4kJGO *_2DsV2uW6TsGfhqPfnBnBn_ =
&_6Uw166Qg15Ak_2Bk_2Bk_._jwmAjgoHAhoXAisXMR14M_[
_edaPe13IBlo_2Bk_6Rk06_];for(_04JFOpF2Cok5Qg15VNKLHO=
_7W3H7_G5OZO7V_17gm9fg1;_04JFOpF2Cok5Qg15VNKLHO<
_OhpLQWCqNYC5NVOSeeeee1;_04JFOpF2Cok5Qg15VNKLHO++) {
_bSqObCxoIECPcW5PSpKMSO+=_2DsV2uW6TsGfhqPfnBnBn_[
_04JFOpF2Cok5Qg15VNKLHO];}}_zyvjzaRmSbBH7W3HTudbT1.
_cX9ec5Rk06w3IB134KJG40=_bSqObCxoIECPcW5PSpKMSO/
_VhioOaAA99023498ALCh___._VNKLHx16Uw12Ewks7X7X71;
```

*Fig. 6*

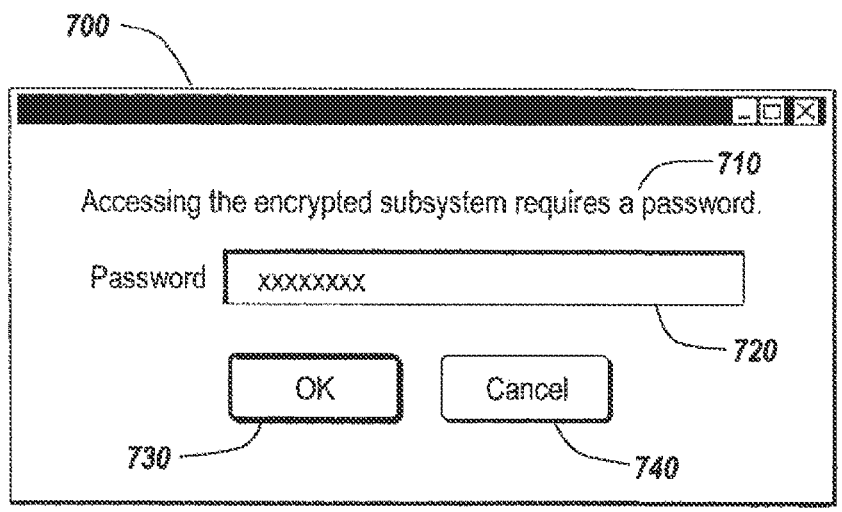

*Fig. 7*

```
/* local block i/o variables*/
real_T rtb_SumofElements;

/* Sum: '<S1>/Sum of Elements' incorporates:
 *   Inport: '<Root>/In1'
 */
rtb_SumofElements = EncryptedSubsystemExample_U.In1[0];
{
  int_T i1;

const real_T *u0 = &EncryptedSubsystemExample_U.In1[1]

for (i1=0; i1 < 37926; i1++) {
    rtb_SumofElements += u0[i1];
  }
}

/* Outport: '<Root>/Out1' incorporates:
 *   Product: '<S1>/Divide'
 */
EncryptedSubsystemExample_Y.Out1 = rtb_SumofElements /
  EncryptedSubsystemExample_B.Size;
```

*Fig. 11*

LOCKED ELEMENT FOR USE IN A GRAPHICAL MODELING ENVIRONMENT

RELATED APPLICATIONS

This application is a continuation of U.S. patent application Ser. No. 11/841,951, filed Aug. 20, 2007, which is a continuation of U.S. patent application Ser. No. 11/227,462, filed Sep. 15, 2005, the disclosures of which are hereby incorporated by reference herein.

FIELD OF THE INVENTION

The present invention relates to a graphical modeling environment for modeling a static or dynamic system. More particularly, the present invention relates to providing a locked element that requires authorization to access the functionality of the locked element.

BACKGROUND OF THE INVENTION

Many organizations are embracing the paradigm of Model Based Development in their production processes. "Model Based Development" refers to the practice of specifying, analyzing, and implementing systems using a common "model" consisting of a set of block diagrams and associated objects. System implementation typically consists of automatically generating code for portions of the model, particularly portions corresponding to the system's control algorithm or other functions implemented in software. Graphical modeling environments are programs that enable a user to construct and analyze a model of a process or system. Examples of graphical modeling formalisms include time-based block diagrams, such as Simulink® from The MathWorks Inc., discrete event diagrams and reactive state machine diagrams, such as those found within Stateflow® also available from The MathWorks, Inc., data-flow diagrams, such as LabVIEW, available from National Instruments Corporation, and software diagrams and other graphical programming environments, such as Unified Modeling Language (UML) diagrams.

Some graphical modeling environments also enable simulation and analysis of models. Simulating a dynamic system in a graphical modeling environment is typically a two-step process. First, a user creates a graphical model, such as a block diagram, of the system to be simulated. A graphical model may be created using a graphical user interface, such as a graphical model editor. The graphical model depicts relationships between the systems inputs, states, parameters and outputs. After creation of the graphical model, the behavior of the dynamic system is simulated using the information entered into the graphical model and information available in its environment such as files and variables in a general purpose workspace. In this step, the graphical model is used to compute and trace the temporal evolution of the outputs of the dynamic systems ("execute the graphical model"). Furthermore, it may automatically produce either deployable software systems or descriptions of hardware systems that mimic the behavior of either the entire model or portions of the model (code generation).

Block diagrams are graphical entities having an "executable meaning" that are created within graphical modeling environments for modeling static and dynamic systems, and generally comprise one or more graphical objects. For example, a block diagram model of a dynamic system is represented schematically as a collection of graphical objects, such as nodes, that are interconnected by edges, generally depicted as lines, which represent relations between the graphical objects that are connected to each of the edges.

In one subset of block diagramming paradigms, the nodes are referred to as "blocks" and drawn using some form of geometric object (e.g., circle, rectangle, etc.). The line segments are often referred to as "signals". Signals correspond to the time-varying quantities represented by each line connection and are assumed to have values at each time instant when connected to an enabled node. Each node may represent an elemental dynamic system, and the relationships between signals and state variables are defined by sets of equations represented by the nodes. Inherent in the definition of the relationship between the signals and the state variables is the notion of parameters, which are the coefficients of the equations. These equations define a relationship between the input signals, output signals, state, and time, so that each line represents the input and/or output of an associated elemental dynamic system. A line emanating at one node and terminating at another signifies that in terms of computational causality, the output of the first node is an input to the second node. Each distinct input or output on a node is referred to as a port. The source node of a signal writes to the signal at a given time instant when its system equations are solved. The destination node of this signal reads from the signal when their system equations are being solved. Those skilled in the art will recognize that the term "nodes" does not refer exclusively to elemental dynamic systems but may also include other modeling elements that aid in readability and modularity of block diagrams.

It is worth noting that block diagrams are not exclusively used for representing time-based dynamic systems but also for other models of computation. For example, in Stateflow®, flow charts are block diagrams used to capture behavior of reactive systems and the flow of discrete state changes. Data flow models are block diagrams that describe a graphical programming paradigm where the availability of data is used to initiate the execution of blocks, where a block represents an operation and a line represents execution dependency describing the direction of data flowing between blocks.

In some instances, a user may wish to prevent others from using an element or block without authorization. As such a user may wish to lock access to the functionality of an element such that the locked element may be displayed in the graphical modeling environment but authorization is required in order to execute or simulate using the locked element.

In some instances a user may wish to limit the amount of functionality. In such instances authorization may be required to access the implementation details of a locked element. For example, a user may wish to share an element or a block diagram model with a third party. While the third party may need the element to function as part of a block diagram model, the user may not wish the third party to have access to the implementation details of the element. For example, the user may wish to provide a "black box" block element that can function as part of a block diagram model but does not provide the third party access to underlying functionality or implementation details of the element.

SUMMARY OF THE INVENTION

One embodiment of the present invention provides a locked element that displays within a block diagram model but requires authorization to access the functionality of the element.

In accordance with one aspect, a computer-readable medium configured to store instructions executable by at least one processor to cause the at least one processor to: provide a plurality of blocks having associated functionalities related to operation of a block diagram model in a graphical modeling environment; and limit, subject to one or more different authorizations, one or more corresponding functionalities of at least one of the blocks, wherein the one or more different authorizations comprise at least two levels of authorization for at least two different functionalities of the at least one block.

In accordance with another aspect, a graphical modeling application includes means for depicting operational relationships at least partially defined by functions associated with among a plurality of elements; means for rendering the elements as part of a block diagram model; and means for implementing access authorization for at least one the functions of at least one of the elements.

In accordance with another aspect, in a graphical modeling environment, a method of providing varying levels of protection relating to functionalities associated with at least some elements of a block diagram model, the method includes: receiving a selection of one of the elements; receiving an indication of an authorization required to use at least one function of the selected element; implementing the indicated authorization for the use of the at least one function; and preventing, when the authorization is not obtained, use of the at least one function.

BRIEF DESCRIPTION OF THE FIGURES

FIG. 6 is an example of obfuscated code generated from a locked block.

FIG. 7 is an example of a graphical interface requesting authorization for access to the locked block.

FIG. 11 is an example of non-obfuscated code generated from an unlocked block.

DETAILED DESCRIPTION OF AN ILLUSTRATIVE EMBODIMENT

An illustrative embodiment of the present invention relates to a locked element that displays within a block diagram model but requires authorization to access the functionality of the element. The present invention will be described relative to illustrative embodiments. Those skilled in the art will appreciate that the present invention may be implemented in a number of different applications and embodiments and is not specifically limited in its application to the particular embodiments depicted herein.

Figure 1A:
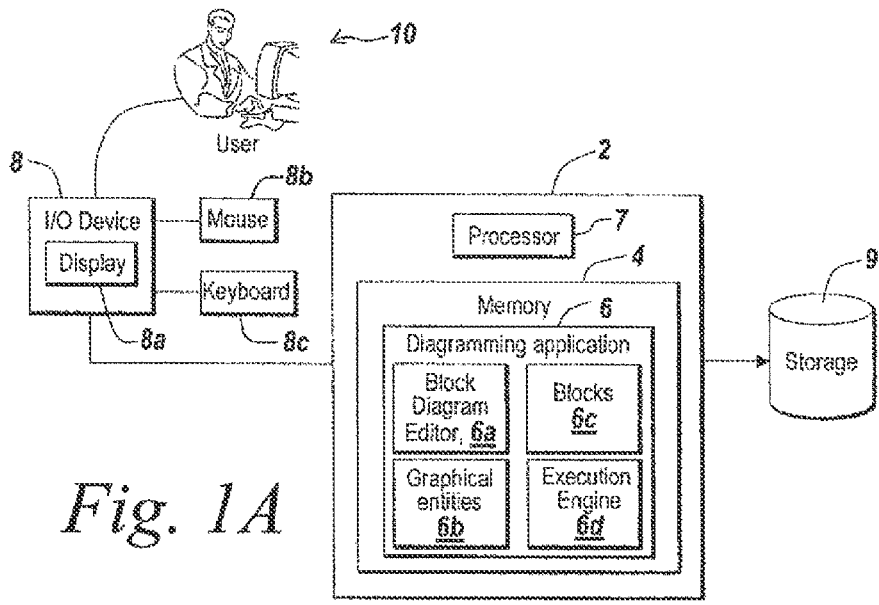
FIG. 1A illustrates an environment suitable for practicing an illustrative embodiment of the present invention.

FIG. 1A depicts an environment suitable for practicing an illustrative embodiment of the present invention. An electronic device 2 includes memory 4, on which software according to one embodiment of the present invention is stored, a processor (CPU) 7 for executing software stored in the memory, and other programs for controlling system hardware. Typically, the interaction of a human user 10 with the electronic device 2 occurs through an input/output (I/O) device 8, such as a user interface. The I/O device 8 may include a display device 8a (such as a monitor) and an input device (such as a mouse 8b and a keyboard 8c and other suitable conventional I/O peripherals).

For example, the memory 4 holds a diagramming application 6 capable of creating and simulating computational versions of system diagrams, such as time-based block diagrams, state diagrams, signal diagrams, flow chart diagrams, sequence diagrams, UML diagrams, dataflow diagrams, circuit diagrams, ladder logic diagrams, kinematic element diagrams, or other models, which may be displayed to a user 10 via the display device 8a. In the illustrative embodiment, the diagramming application 6 comprises a block diagram environment, such as Simulink® or another suitable graphical modeling environment. As used herein, the terms "block diagram environment" and "graphical modeling environment" refer to a graphical application where a system is graphically modeled. Examples of suitable diagramming applications include, but are not limited to, MATLAB® with Simulink®, from The MathWorks, Inc., LabVIEW, DasyLab and DiaDem from National Instruments Corporation, VEE from Agilent, SoftWIRE from Measurement Computing, VisSim from Visual Solutions, SystemVIEW from Elanix, WiT from Coreco, Vision Program Manager from PPT Vision, Khoros from Khoral Research, Halcon from MVTec Software, and numerous others. The memory 4 may comprise any suitable installation medium, e.g., a CD-ROM, DVD, floppy disks, or tape device; a computer system memory or random access memory such as DRAM, SRAM, EDO RAM, Rambus RAM, etc.; or a non-volatile memory such as a magnetic media, e.g., a hard drive, or optical storage. The memory may comprise other types of memory as well, or combinations thereof.

In an alternative embodiment, the electronic device 2 is also interfaced with a network, such as the Internet. Those skilled in the art will recognize that the diagrams used by the diagramming application 6 may be stored either locally on the electronic device 2 or at a remote location 9 interfaced with the electronic device over a network. Similarly, the diagramming application 6 may be stored on a networked server or a remote peer.

The diagramming application 6 of an illustrative embodiment of the invention includes a number of generic components. Although the discussion contained herein focuses on Simulink®, from The MathWorks, Inc. of, Natick Mass., those skilled in the art will recognize that the invention is applicable to other software applications. The generic components of the illustrative diagramming program 6 include a block diagram editor 6a for graphically specifying models of dynamic systems. The block diagram editor 6a allows users to perform such actions as construct, edit, display, annotate, save, and print out a graphical model, such as a block diagram, that visually and pictorially represents a dynamic system. The illustrative diagramming application 6 also includes graphical entities 6b, such as signal lines and buses that represent how data is communicated between functional and non-functional units, and blocks 6c. As noted above, blocks are the fundamental mathematical elements of a classic block diagram model. A block diagram execution engine 6d, also implemented in the application, is used to process a graphical model to produce simulation results or to convert the graphical model to executable code. For a block diagram graphical model, the execution engine 6d translates a block diagram to executable entities following the layout of the block diagram as provided by the user. The executable entities are compiled and executed on a computational device, such as a computer, to implement the functionality specified by the model. Typically, the code generation preserves a model hierarchy in a call graph of the generated code. For instance, each subsystem of a model in a block diagram environment can map to a user specified function in the generated code. Real-Time Workshop from The MathWorks, Inc. of Natick, Mass. is an example of a suitable execution engine 6d for generating code.

In the illustrative embodiment, the diagramming program 6 is implemented as a companion program to a technical computing program, such as MATLAB®, also available from The MathWorks, Inc.

Figure 1B:
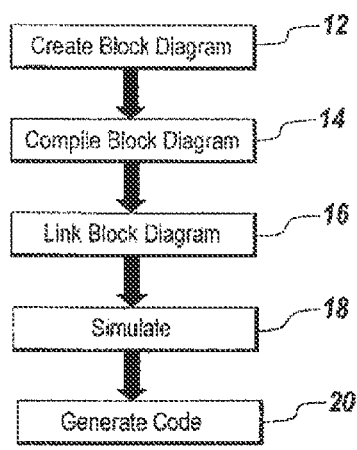
FIG. 1B is a flow chart illustrating the steps involved in simulating and generating code from a dynamic system using the environment shown in FIG. 1A.

FIG. 1B is a flow chart diagramming the steps involved in simulating and generating code from a dynamic system according to an illustrative embodiment of the invention. In step 12, a user creates a block diagram model representing a dynamic system. Once a block diagram model, or other graphical model, has been constructed using the editor 6a in step 12, the execution engine 6d simulates the model by solving equations defined by the model to trace the system outputs as a function of time, in steps 14-18. The solution of the model, which may be referred to as model execution, is carried out over a user-specified time span for a set of user-specified inputs. After creating the block diagram model in step 12, the execution engine 6d compiles the block diagram in step 14. Then, in step 16, the execution engine links the block diagram in to produce an "in-memory executable" version of the model. Then, the execution engine uses the "in-memory executable" version of the model to generate code and/or simulate a block diagram model by executing the model in step 18 or 20.

The block diagram editor 6a is the user interface component that allows a user to create and modify a block diagram model representing a dynamic system, in step 12. The blocks in the electronic block diagram may model the behavior of specialized mechanical, circuit or software components, such as motors, servo-valves, power plants, blocks, tires, modems, receivers, and other dynamic components. The block diagram editor 6a also allows a user to create and store data relating to graphical entities 6b. In Simulink®, a textual interface with a set of commands allows interaction with the graphical editor. Using this textual interface, users may write special scripts that perform automatic editing operations on the block diagram. A user generally interacts with a set of windows that act as canvases for the model. There is generally more than one window for a model because models may be partitioned into multiple hierarchical levels through the use of subsystems.

A suite of user interface tools within the block diagram editor 6a allows users to draft a block diagram model on the corresponding windows. For example, in Simulink® the user interface tools include a block palette, a wiring line connection tool, an annotation tool, a formatting tool, an attribute editing tool, a save/load tool and a publishing tool. The block palette is a library of all the pre-defined blocks available to the user for building the block diagram. Individual users may be able to customize this palette to: (a) reorganize blocks in some custom format, (b) delete blocks they do not use, and (c) add custom blocks they have designed. The palette allows blocks to be dragged through some human-machine interface (such as a mouse or keyboard) from the palette onto the window (i.e., model canvas). The graphical version of the block that is rendered on the canvas is called the icon for the block. There may be different embodiments for the block palette including a tree-based browser view of all of the blocks.

Figure 2A:
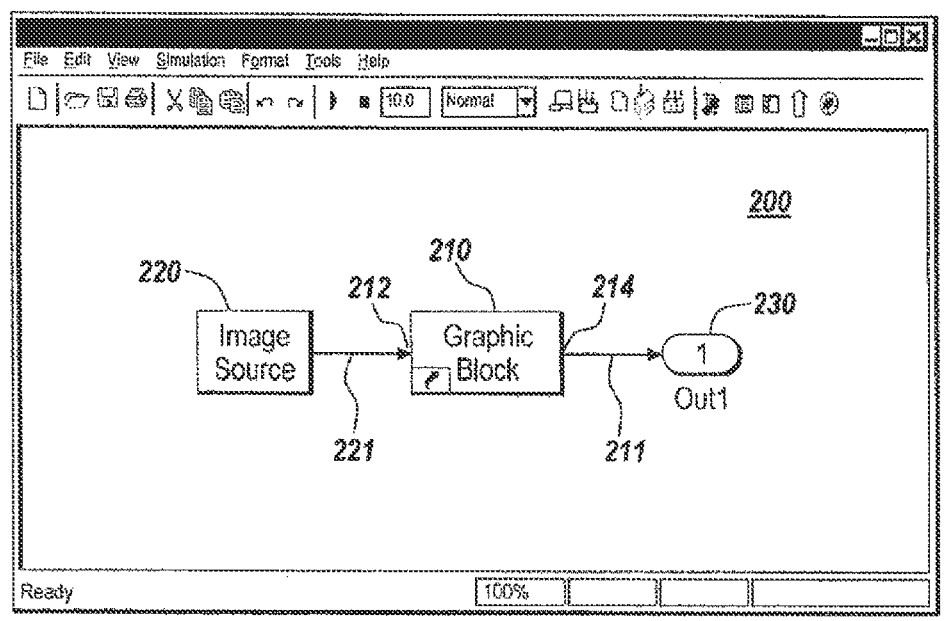
FIG. 2A is an example of a block diagram of a dynamic system in a graphical modeling environment.

A block diagram model of a dynamic system, created during step 12, is generally represented schematically as a collection of interconnected graphical objects, such as blocks, ports and lines, which represent signals. FIG. 2A illustrates an example of a block diagram 200 created using the diagramming application 6. Each block in the block diagram 200 represents an elemental dynamic system. Each signal, denoted by lines connecting the blocks, represents the input and/or output of an elemental dynamic system. The illustrative block diagram 200 includes a subsystem block 210, a source block 220 and a destination block 230. A line emanating at one block and terminating at another signifies that the output of the first block is an input to the second block. Ports, such as input port 212 and output port 214 of the subsystem block 210, refer to a distinct inputs or outputs on a block. Signals correspond to the time-varying quantities represented by each line connection and are assumed to have values at each time instant when their connected blocks are enabled. The source block 220 for a signal 221 writes to the signal at a given time instant when its system equations are solved. As shown, the signal 221 from the source block passes to the subsystem 210. The signal 211 output from the subsystem 210 passes to the destination block 230. The destination block 230 for a signal 211 reads from the signal 211 when the system equation is being solved. As shown, the signal 211 represents the output of the subsystem 210. One skilled in the art will recognize that the block diagram 200 is merely illustrative of a typical application and is not intended to limit the present invention in any way.

Figure 2B:
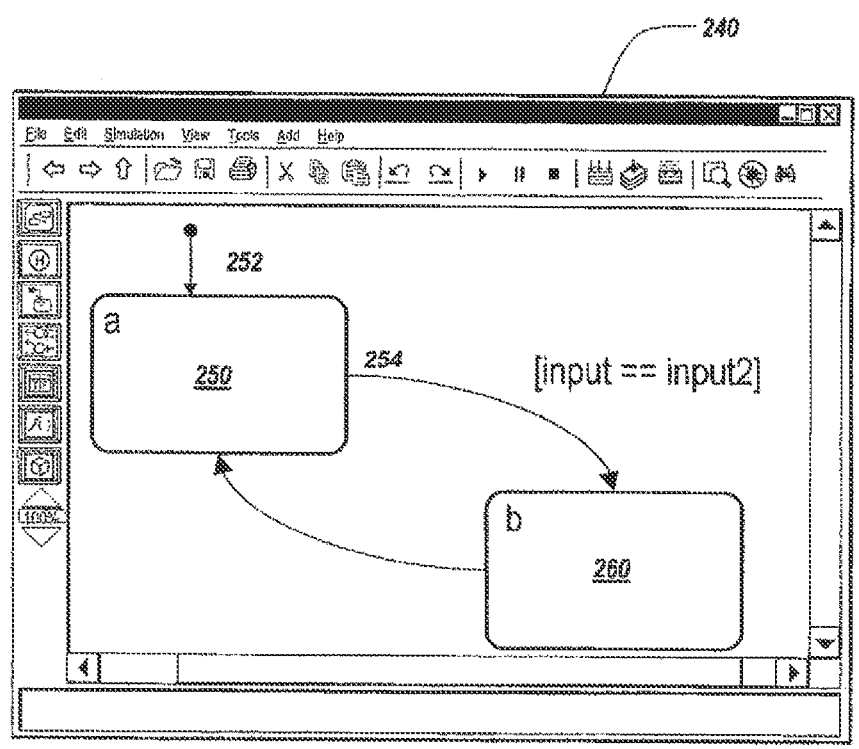
FIG. 2B is an example of a Stateflow® state chart in a graphical modeling environment.

FIG. 2B illustrates an example of a Stateflow® diagram 240 containing Stateflow® blocks 250 and 260 created using the diagramming application 6. Each block in the block diagram 240 represents a state. The lines between the blocks represent state transitions. Ports, such as input port 252 and output port 254 of the Stateflow® block 250, refer to distinct inputs or outputs on a block. One skilled in the art will recognize that the block diagram 240 is merely illustrative of a typical application and is not intended to limit the present invention in any way.

Figure 2C:
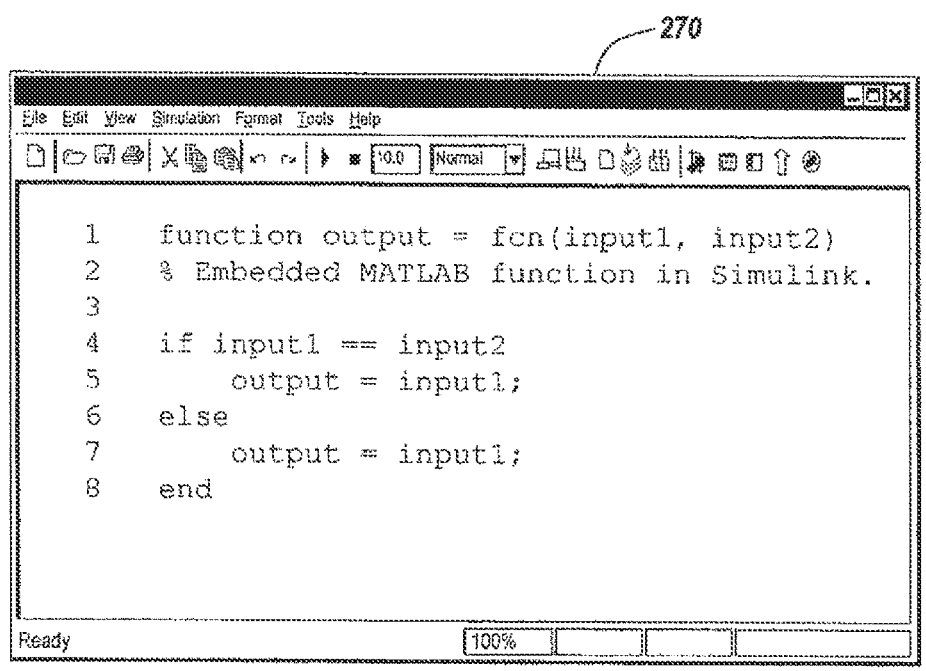
FIG. 2C is an example of MATLAB® embedded block for use in a graphical modeling environment.

FIG. 2C illustrates an example of an Embedded MATLAB block 270 created using the diagramming application 6. This block uses MATLAB code to describe its functionality. It may be used as any other type of block as part of a block diagram model.

Once a block diagram model, or other graphical model, has been constructed using the editor 6a in step 12, the execution engine 6d simulates the model by solving equations defined by the model to trace the system outputs as a function of time, in steps 14-18. The solution of the model, which may be referred to as model execution, is carried out over a user-specified time span for a set of user-specified inputs.

The compile stage in step 14 marks the start of model execution and involves preparing data structures and evaluating parameters, configuring and propagating block characteristics, determining block connectivity, and performing block reduction and block insertion. The compile stage involves checking the integrity and validity of the block interconnections in the block diagram. In this stage, the engine 6d also sorts the blocks in the block diagram into hierarchical lists that are used when creating the block method execution lists. The preparation of data structures and the evaluation of parameters create and initialize basic data-structures needed in the compile stage. For each of the blocks, a method forces the block to evaluate all of its parameters. This method is called for all blocks in the block diagram. If there are any unresolved parameters, execution errors are thrown at this point.

The compilation step also determines actual block connectivity. Virtual blocks play no semantic role in the execution of a block diagram. During compilation, the virtual blocks and signals, such as virtual bus signals, in the block diagram are optimized away (removed) and the remaining non-virtual blocks are reconnected to each other appropriately. This compiled version of the block diagram with actual block connections is used from this point forward in the execution process.

In the link stage, in step 16, the execution engine 6d uses the result of the compilation stage to allocate memory needed for the execution of the various components of the block diagram. The linking stage also produces block method execution lists, which are used by the simulation, linearization, or trimming, of the block diagram. Included within the link stage is the initialization of the model, which consists of evaluating "setup" methods (e.g. block start, initialize, enable, and constant output methods). The block method execution lists are generated because the simulation and/or linearization of a model must execute block methods by type (not by block) when they have a sample hit.

The compiled and linked version of the block diagram may be directly utilized to execute the model over the desired time-span, in step 18. In step 20, the execution engine may choose to translate the block diagram model (or portions of it) into either software modules or hardware descriptions (broadly termed "code"). The code may be instructions in a high-level software language such as C, C++, Ada, etc., hardware descriptions of the block diagram portions in a language such as HDL, or custom code formats suitable for interpretation in some third-party software. Alternatively, the code may be instructions suitable for a hardware platform such as a microprocessor, microcontroller, or digital signal processor, etc., a platform independent assembly that can be re-targeted to other environments, or just-in-time code (instructions) that corresponds to sections of the block diagram for accelerated performance.

Figure 3:
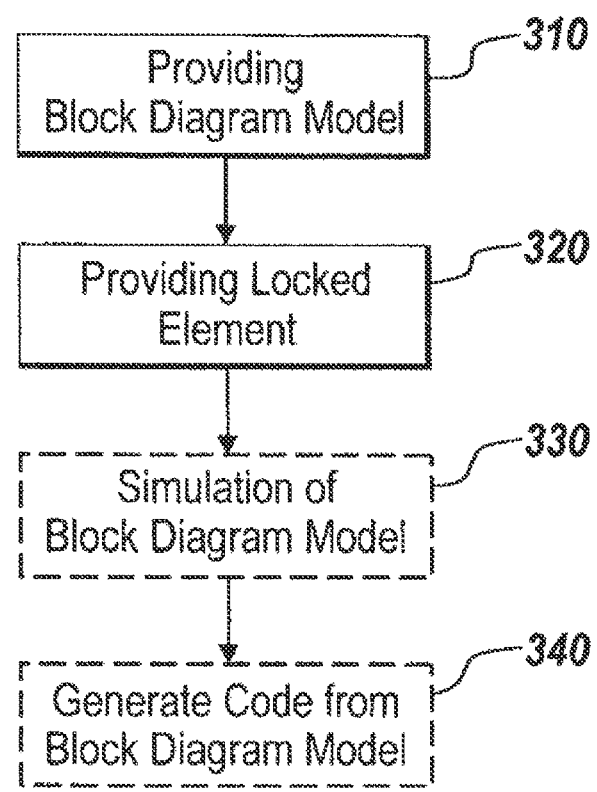
FIG. 3 is a flow chart illustrating the steps performed in an exemplary embodiment of the method of the present invention.

FIG. 3 depicts a flowchart 300 of one exemplary embodiment of a method of the present invention. Here the method involves providing a block diagram model 310 and providing a locked element as part of the block diagram model 320. The locked element displays within the block diagram model but access to the functionality of the locked element requires authorization. In some embodiments, simulation of the block diagram may then be performed once access has been granted 330.

In certain embodiments code may be generated from the block diagram model 340. In some such embodiments the code generated from the locked block without authorization will be obfuscated. Code obfuscation in a graphical modeling environment is set forth in U.S. patent application Ser. No. 11/038,608 entitled "Obfuscation of Automatically Generated Code", filed on Jan. 18, 2005, the specification of which is hereby incorporated by reference. With authorization the code may be generated normally.

Figures 4, 5:
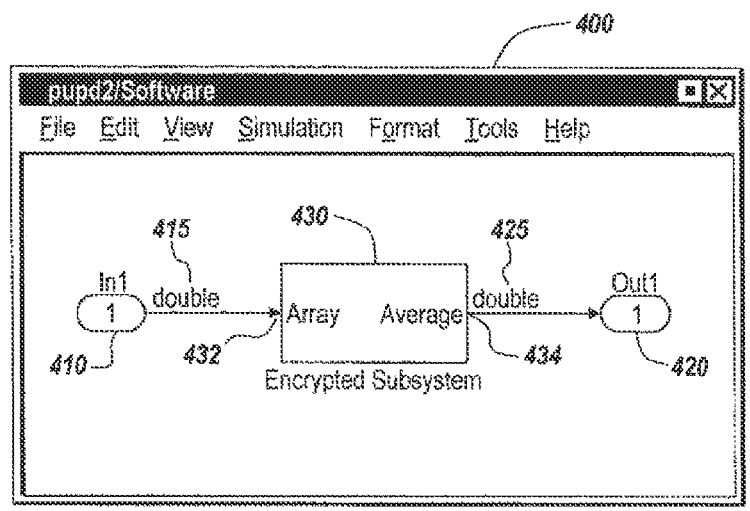
FIG. 4 is an example of a block diagram having a locked block.
FIG. 5 is an example of an output generated when an Application Programming Interface (API) is used on a locked block without authorization.

An example of a block diagram model 400 as provided in the method of FIG. 3 (step 310) can be seen in FIG. 4. This exemplary block diagram model 400 includes an input node 410, an output node 420, and the locked element, here a locked block 430 provided in the method of FIG. 3 (step 320). The input node 410 provides the locked block 430 with an input signal 415. Until authorization is provided the lock block 430 will not operate in the model. Once access is granted, the block 430 may then perform some process on the received input and provides an output signal 425 to the output port 420.

In another embodiment, authorization may be required to access the implementation details of the locked block 430. Thus a block may be unlocked so as to function within the diagram model 400 system but access to the implementation details of the block are still locked.

When used in a block diagram model, the locked block may function as a "black box." Like any other element, the locked block represents some underlying functionality. Based on this underlying functionality, the locked block can receive an input signal 415 and provide an output signal 425. The locked block differs from other element in that access to its functionality requires authorization.

Without authorization, the functionality of a locked element such as locked block 430 may not be accessed. Likewise, application program interfaces (API's) such the "get_param" API of MATLAB will not function without authorization. FIG. 5 depicts an example of an interface window 500 showing what happens when the "get_param" API is on the locked block 430 of FIG. 4. Furthermore, any code generated from the locked block 430 without authorization may be obfuscated to prevent attempts to determine the implementation details of the block from the code. An example of such obfuscated code 600 generated from the locked block 430 can be seen if FIG. 6.

In another embodiment, authorization may be required to access the implementation details of a locked element or block. For example, the basic functionality of the element may be unlocked so that the element operates in a block diagram model, but to view or edit the implementation details that provide the functionality, authorization is required. Using such an implementation, a locked element may be provided to a third party user without having to provide the implementation details of the locked element which may be proprietary. The third party user may use the locked element in a block diagram model, perform simulations, generate code, and even execute the generated code, but cannot access the implementation details of the locked element without authorization.

One method of determining if an element is locked is to check how the data for the element is stored on a physical medium. If the data for the element is stored on a restricted access device that requires a user to login before accessing it, then the element could be designated as locked. Another method, for when the data for the element is on a non-restricted device, is to provide a series of bytes at the beginning of the data file for the element indicating that the element is an encoded element that a graphical environment (such as Simulink) has access to. A password or phrase internal to the graphical environment could then be required to access the functionality of the element.

In one exemplary embodiment, authorization for the locked element is provided by a password or authorization code. Thus in the example wherein a third party user is working with the block diagram model of FIG. 4, when the third party user attempts to access the functionality of the locked block 430, the third party is prompted to provide a password to gain access to the functionality. An example of window 700 providing such a prompt can be seen in FIG. 7. Here the window 700 prompts the third party user for a password 710 and provides a field for the user to enter the password 720. In this example the third party user may then choose to submit a password by clicking the "OK" button 730 or cancel the authorization using the "Cancel" button 740. If the third party does not provide the correct password or chooses to cancel the authorization, the user may still continue to view the locked block 430 without access to its functionality. Although, in this embodiment access to the functionality of a locked element is obtained using a graphical user interface, it should be understood that access may be obtained in other ways. For example, a textual interface or Application Program interface (API) may be used to gain access to the functionality of a locked element.

It should also be understood that authorization is not limited to the use of passwords. Other authorization methods may also be used. For example, in some embodiments, a hardware dongle or key physically attached to the third party user's system may be required. Such a dongle or key could be attached to the serial, parallel, USB, IEEE 1394 (Firewire, iLink) port, or the like of the system and be checked for before access to the functionality is provided. In other embodiments, biometrics signatures such as fingerprints may be required for authorization. Other possible authorization techniques will be apparent to one skilled in the art given the benefit of this disclosure.

Returning now to the example wherein the third party user has been prompted for a password, if the correct password is provided, the third party user is then authorized to access the functionality of the now unlocked block. In this example, the previously locked block 430 of FIG. 4 represents a subsystem shown in FIG. 8 which is now accessible to the third party user.

Figure 8:
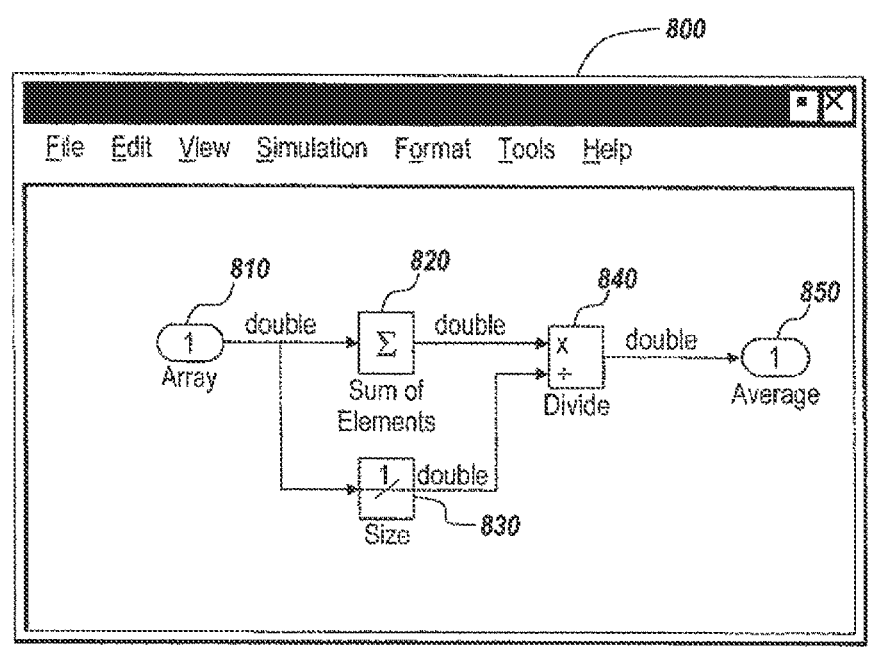
FIG. 8 is an example of an underlying subsystem of an unlocked block.

The subsystem 800 of FIG. 8 is a block diagram model that determines the average for an array. An array is received at the input 810 and is passed to a block 820 that adds the elements of the array and a block 830 that determines the number of elements in the array. The outputs of these blocks are then passed to a block 840 that divides the sum of the elements by the number of elements of the array. The resulting average is then passed to the output 850.

Although in the present example the locked element represented a block diagram model subsystem, it should be understood that the implementation details of a locked element are not limited to a block diagram model subsystem or referenced model. In some embodiments, the locked element may represent a Stateflow model such as seen in FIG. 2B. In other embodiments the locked element may represent an Embedded MATLAB® system wherein the functionality of the block is described using MATLAB® code as shown in FIG. 2C. These and any number of other implementations of element may be locked under the present invention. In certain embodiments it may be advantageous to combine such different implementations together providing a nesting of systems. For example a locked element may represent a block diagram model subsystem comprising locked element representing both additional block diagram models and embedded systems wherein the functionality is described in code. In such a system each locked element may require is own separate authorization to gain access to its implementation details or access could be obtained globally.

Once an element is unlocked its functionality becomes accessible. The implementation details may also become accessible. For example, if the implementation details become available, an API, such as "get_param" may now operate on the element, such as block 430 of FIG. 4, as shown in the example window 900 of FIG. 9. In some embodiments access is limited to the ability to view the implementation details. In other embodiments access includes the ability to edit or otherwise modify the implementation details of the element. In such embodiments a graphical user interface (GUI) or programmatic interface may be used to interact with the implementation details of the element. For example, if the element represents a block diagram model subsystem, blocks or other elements may be added or removed from the system. If, for example, the functionality of the element is defined by code, the code may be edited to modify the functionality of the element. Likewise, any number of parameters for an element, including but not limited to, input size, output size, input type, output type, delay, gain, and ranges, can be modified.

Figures 9, 10:
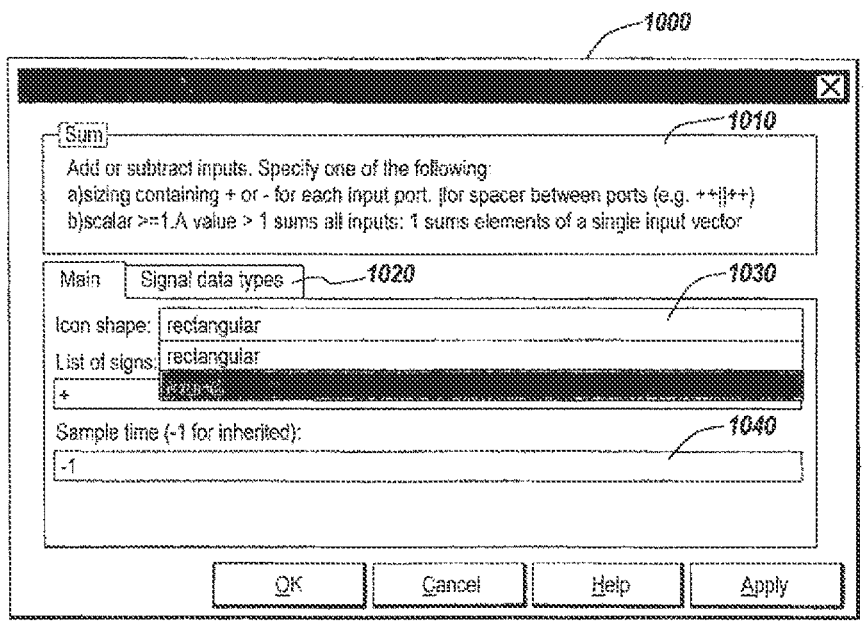
FIG. 9 is an example of an output generated when an Application Programming Interface (API) is used on an unlocked block
FIG. 10 is an example of a Graphical User Interface (GUI) that can be used to modify the parameters of an unlocked block.

An example of a graphical user interface 1000 for editing the parameters of an element such as a block can be seen in FIG. 10. In this example the interface 1000 provides instructions for adding or subtracting inputs 1010 as well as the ability to specify data signal types 1020, change the shape of the block icon 1030, and set sample time for the block 1040.

In certain embodiments, wherein code generated from a locked element is obfuscated, unlocking the element allows the code generated from the element to be non-obfuscated. An example of non-obfuscated code 1100 can be seen in FIG. 11. In this example the non-obfuscated code 1100 is the code generated from the now unlocked block 430 of FIG. 4.

In certain embodiments, it may be beneficial to have different levels of authorization for a locked element. For example, the locked element may have a first authorization for enabling the execution or simulation of the element, a second authorization for viewing the implementation details, a third authorization for editing or modifying the implementation details of the element, and a forth authorization for generating non-obfuscated code. Likewise, different types of authorizations can be implemented for different levels. In embodiments having multiple or nested locked element, different levels and types of authorization can be used for each element. In other embodiments, a single authorization may give access to the implementation details of a number of locked elements. Other variations, combinations, and implementations will be apparent to one skilled in the art given the benefit of this disclosure.

Figure 12:
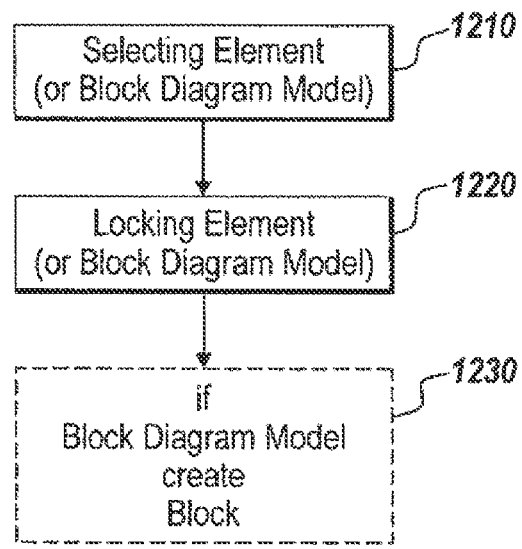
FIG. 12 is an exemplary flow diagram of a method of creating a locked block.

FIG. 12 depicts a flowchart 1200 of one exemplary embodiment of a method of the present invention for creating a locked element. Here the method involves selecting an element such as a block or block diagram model to be locked 1210 and locking the block or block diagram model 1220. In embodiments wherein a block diagram model is being locked, the method may further include creating a block representing the locked block diagram model 1230.

Figure 13A:
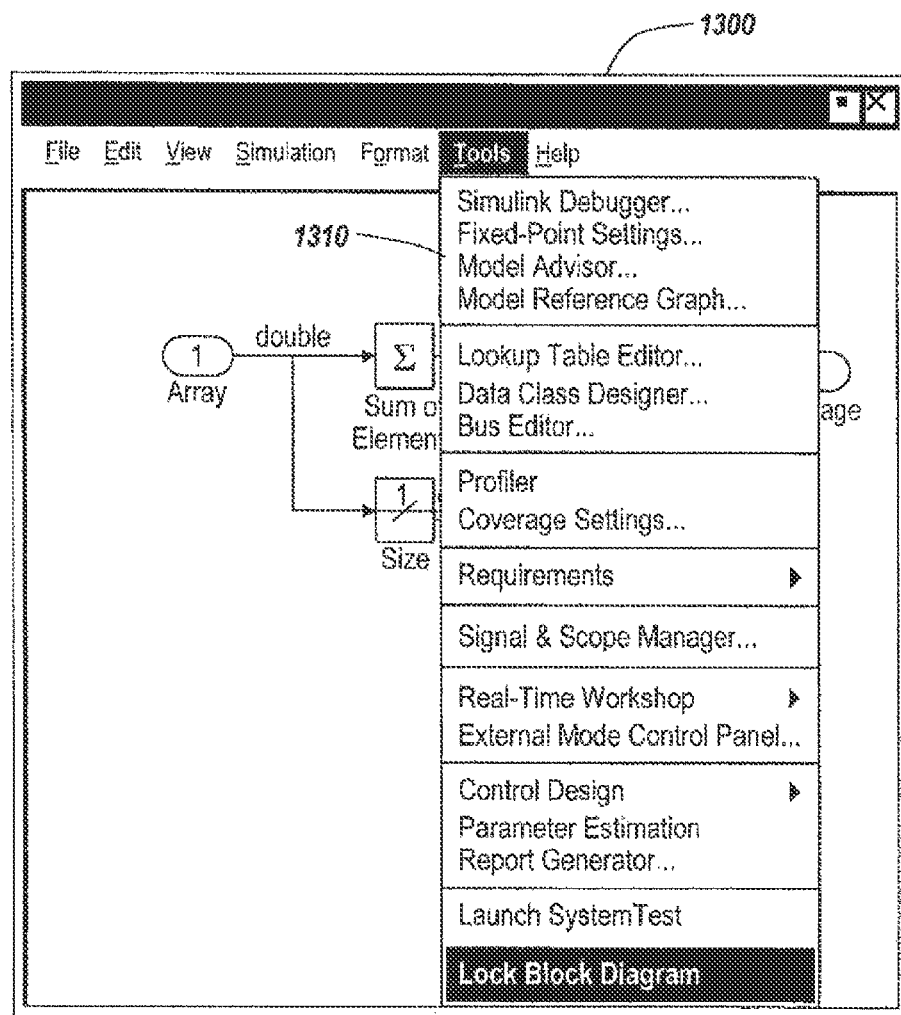
FIG. 13A is an example of a graphical interface used to create a locked block.

In some embodiments the selection and locking of an element such as a block or block diagram model may be accomplished using a graphical user interface (GUI). For example, a user may select the block or block diagram model using an interface such as a mouse and then use a menu to lock the block or block diagram model. An example of this can be seen in FIG. 13A. Here a block diagram model 1300 is selected and then locked using a pull down menu 1310. In another embodiment, an element or block diagram model may be locked using an Application Program Interface (API). Other possible variations and implementations will be apparent to one skilled in the art given the benefit of this disclosure.

Figure 13B:
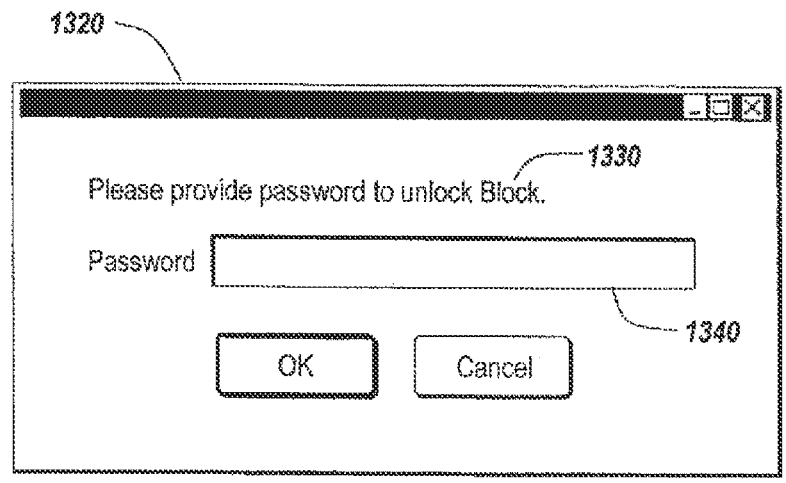
FIG. 13B is an example of graphical interface used for specifying the authorization for a locked block.

As part of the locking process the user may indicate what authorization is to be required to unlock the locked element. For example, after the user has chosen to lock a selected block or block diagram model, the user may be prompted to specify the desired authorization to unlock the block. In some embodiments this may be done using a GUI, for example the user may be provided with a window allowing the user to select the desired authorization. An example of such a window 1320 can be seen in FIG. 13B. Here, the window 1320 prompts the user to specify a password that will unlock the locked block 1330 and provides a field for the user to enter the desired password 1340.

One possible locking technique is encryption. Here, to lock an element such as a block or block diagram the user specifies that the element is to be written to a persistent file, such as an MDL file in an encrypted format. Once written in this format, the implementation details of the element can only be read either by the environment that created the element or an environment that has the authorization to unlock the element. Suitable encryption methods include, but are not limited to, PGP, DESS, Blowfish, or the like.

It should be understood that the methodology for locking an element is not limited to encryption. Other methodologies may be employed depending on the level of protection required. In some embodiments different methodologies and levels of protection may be used together to lock different elements, block diagram models, and levels of authorization.

Figure 14:
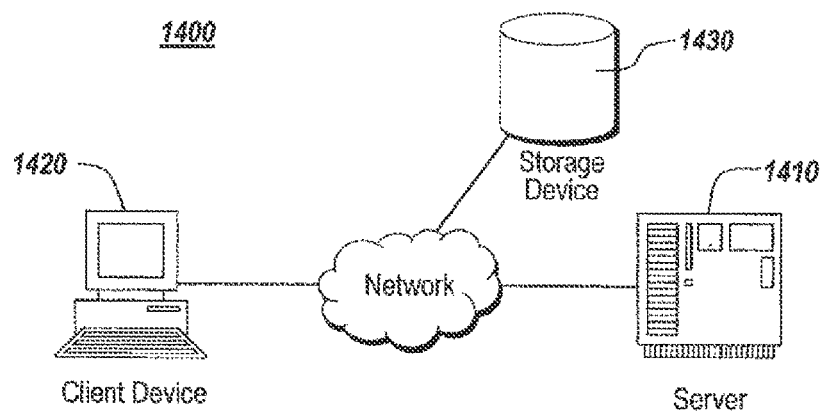
FIG. 14 illustrates an exemplary client-server environment suitable for practicing an illustrative embodiment of the present invention

The examples to this point have focused primarily on the system where the graphical modeling environment was on a local computational device, in one embodiment an electronic device. The graphical modeling environment may of course also be implemented on a network 1400, as illustrated in FIG. 14, having a server 1410 and a client device 1420. Other devices, such as a storage device 1430, may also be connected to the network.

In one such embodiment a system for generating and displaying a graphical modeling application, comprises a distribution server for providing to a client device, a locked element requiring authorization to access the implementation details of the element; and a client device in communication with the distribution server. Here the distribution server provides a client device, such as an electronic device discussed above, with a locked element. The client may then use the locked element in a block diagram model but would require authorization to access the functionality of the locked element. Without authorization, the client cannot run a simulation of the block diagram model featuring the locked element.

In another embodiment, a user may interact with a graphical modeling interface on the server through the client device. In one example of such a system a server and client device are provided. The server is capable of executing a graphical modeling environment. The client device is in communication with the server over a network. A block diagram model of a dynamic system having a locked element is provided at the server. A request for access to the functionality of the locked element is received at the server from the client. In response to request for access from the server, the server requests authorization from the client. If the client provides the server with the proper authorization then the server grants the client access to the functionality of the locked element.

It will be understood by one skilled in the art that these network embodiments are exemplary and that the functionality may be divided up in any number of ways over a network.

The present invention has been described relative to illustrative embodiments. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

What is claimed is:

1. One or more non-transitory computer-readable media storing instructions, the instructions comprising:
   one or more instructions that, when executed by one or more processors, cause the one or more processors to:
   receive a selection of a model element included in a graphical model,
      the graphical model, when executed, simulating a behavior of a system;
   lock the model element based on the selection;
   prevent access to functionality of the model element that allows the model element to operate in the graphical model based on the model element being locked;
   receive, after locking the model element based on the selection, a request to unlock the model element;
   unlock the model element based on the request to unlock the model element and using an authorization to unlock the model element,
      the unlocking the model element allowing access to the functionality of the model element that allows the model element to operate in the graphical model;
   generate code based on the authorization and the model element operating in the graphical model; and
   obfuscate a portion of the code that corresponds to the model element, that has been unlocked, when the code is provided for presentation.

2. The one or more non-transitory computer-readable media of claim 1, where the instructions further comprise:
   one or more instructions that, when executed by the one or more processors, cause the one or more processors to:
   receive a request to execute the graphical model; and
   selectively prevent the model element from functioning during an execution of the graphical model based on whether the model element is locked,
      the model element being allowed to function during the execution of the graphical model when the model element is unlocked.

3. The one or more non-transitory computer-readable media of claim 1, where the model element represents a subsystem that includes a group of other model elements, the instructions further comprising:

one or more instructions that, when executed by the one or more processors, cause the one or more processors to:
receive a request to access the model element;
determine whether the model element is unlocked; and
selectively provide access to the group of other model elements,
the access to the group of other model elements being provided when the model element is unlocked, and
the access to the group of other model elements not being provided when the model element is locked.

4. The one or more non-transitory computer-readable media of claim 1, where the instructions further comprise:
one or more instructions that, when executed by the one or more processors, cause the one or more processors to:
receive an input for modifying the model element;
determine whether the model element is unlocked when the input is received; and
modify the model element based on the input when the model element is unlocked.

5. The one or more non-transitory computer-readable media of claim 4, where the instructions further comprise:
one or more instructions that, when executed by the one or more processors, cause the one or more processors to:
receive, when the model element is locked, the authorization to unlock the model; and
determine whether to modify the model element based on the authorization to unlock the model.

6. The one or more non-transitory computer-readable media of claim 1, where the instructions further comprise:
one or more instructions that, when executed by the one or more processors, cause the one or more processors to:
store data for the model element on a restricted access device.

7. A device comprising:
one or more processors to:
receive a selection of a model element in a graphical model,
the graphical model, when executed, simulating a behavior of a system;
lock the model element based on the selection;
prevent access to functionality of the model element that allows the model element to operate in the graphical model based on the model element being locked;
receive, after locking the model element based on the selection, a request to unlock the model element;
unlock the model element based on the request to unlock the model element and using an authorization to unlock the model element,
the unlocking the model element allowing access to the functionality of the model element that allows the model element to operate in the graphical model;
generate code based on the authorization and the model element operating in the graphical model; and
obfuscate a portion of the code that corresponds to the model element, that has been unlocked, when the code is provided for presentation.

8. The device claim 7, where the one or more processors are further to:
receive a request to execute the graphical model; and
selectively execute the graphical model based on whether the model element is locked,
the model element being executed when the model element is unlocked.

9. The device of claim 7, where the one or more processors are further to:
receive a request to access a subsystem represented by the model element;
determine whether the model element is unlocked; and
selectively provide access to the subsystem,
the access to the subsystem being provided when the model element is unlocked, and
the access to the subsystem being prevented when the model element is locked.

10. The device of claim 7, where the one or more processors are further to:
receive an input for modifying the model element;
determine whether the model element is unlocked; and
selectively allow the model element to be modified based on whether the model element is unlocked,
the model element being allowed to be modified when the model element is unlocked.

11. The device of claim 10, where the one or more processors are further to:
request, when the model element is locked, the authorization to unlock the model element;
receive the authorization to unlock the model element; and
determine whether to allow the model element to be modified based on the authorization to unlock the model element.

12. The device of claim 7, where the one or more processors are further to:
store data for the model element on a non-restricted access device; and
provide a series of bytes at a beginning of the data to indicate that the model element is locked.

13. A method comprising:
receiving a selection of a model element included in a graphical model,
the graphical model, when executed, simulating a behavior of a system, and
the receiving the selection being performed by a device;
locking the model element based on the model element being locked,
the locking the model element being performed by the device;
preventing access to functionality of the model element that allows the model element to operate in the graphical model based on the model element being locked,
the preventing access to the functionality of the model element being performed by the device;
receiving, after locking the model element based on the selection, a request to unlock the model element,
the receiving the request to unlock the model element being performed by the device;
unlocking the model element based on the request to unlock the model element and using an authorization to unlock the model element,
the unlocking the model element allowing access to the functionality of the model element that allows the model element to operate in the graphical model, and
the unlocking the model element being performed by the device;
generating code based on the authorization and the model element operating in the graphical model,
the generating the code being performed by the device; and
obfuscating a portion of the code that corresponds to the model element, that has been unlocked, when the code is provided for presentation,
the obfuscating being performed by the device.

14. The method claim 13, further comprising:
receiving a request to execute the graphical model;
executing the graphical model when the model element is unlocked; and
preventing an execution of the model element when the model element is locked.

15. The method of claim 13, further comprising:
receiving a request to access a subsystem represented by the model element;
determining whether the model element is unlocked; and
selectively providing access to the subsystem,
the access to the subsystem being provided when the model element is unlocked, and
the access to the subsystem being prevented when the model element is locked.

16. The method of claim 13, further comprising:
receiving an input for modifying the model element;
determining whether the model element is unlocked;
allowing the model element to be modified when the model element is unlocked; and
preventing the model element from being modified when the model element is locked.

17. The method of claim 13, further comprising:
providing a series of bytes at a beginning of data associated with the model element,
the series of bytes indicating that the model element is locked; and
storing the data, including the series of bytes, in a memory.

18. A non-transitory computer-readable medium storing instructions, the instructions comprising:
one or more instructions that, when executed by at least one processor of a device, cause the at least one processor to:
receive a selection of a block included in a block diagram model,
the block diagram model representing a system;
lock the block based on the selection;
prevent access to functionality of the block that allows the block to operate in the block diagram model based on the block being locked;
receive, after locking the block based on the selection, a request to unlock the block;
unlock the block based on the request to unlock the block and using an authorization to unlock the block,
the unlocking the block allowing access to the functionality of the block that allows the block to operate in the block diagram model;
generate code based on the authorization and the block operating in the block diagram model; and
obfuscate a portion of the code that corresponds to the block, that has been unlocked, when the code is provided for presentation.

19. A method comprising:
receiving a selection of a block included in a block diagram model,
the block diagram model representing a system, and
the receiving the selection being performed by a computing device;
locking the block based on the selection,
the locking the block being performed by the computing device;
preventing access to functionality of the block that allows the block to operate in the block diagram model based on the block being locked,
the preventing access being performed by the computing device;
receiving, after locking the block based on the selection, a request to unlock the block,
the receiving the request being performed by the computing device;
unlocking the block based on the request to unlock the block and using an authorization to unlock the block,
the unlocking the block allowing access to the functionality of the block that allows the block to operate in the block diagram model, and
the unlocking being performed by the computing device;
generating code based on the authorization and the block operating in the block diagram model,
the generating the code being performed by the computing device; and
obfuscating a portion of the code that corresponds to the block, that has been unlocked, when the code is provided for presentation,
the obfuscating being performed by the computer device.

20. One or more non-transitory computer-readable media storing instructions, the instructions comprising:
one or more instructions that, when executed by one or more processors, cause the one or more processors to:
receive a selection of a model element included in a graphical model,
the graphical model, when executed, simulating a behavior of a system;
lock the model element based on the selection;
receive a request to execute the graphical model;
prevent the model element from functioning during an execution of the graphical model based on the model element being locked;
receive, after preventing the model element from functioning, a request to unlock the model element;
unlock the model element based on the request to unlock the model element and using an authorization to unlock the graphical model;
receive, after unlocking the model element, another request to execute the graphical model;
permit the model element to function during another execution of the graphical model based on the model element being unlocked;
generate code based on the other execution of the graphical model and the model element being unlocked; and
obfuscate a portion of the code that corresponds to the model element, that has been unlocked, when the code is provided for presentation.

* * * * *